(12) United States Patent
Walrant

(10) Patent No.: US 11,477,033 B2
(45) Date of Patent: Oct. 18, 2022

(54) AUTHENTICATION WITHOUT PRE-KNOWN CREDENTIALS

(71) Applicant: NXP B.V., Eindhoven (NL)

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 174 days.

(21) Appl. No.: 16/782,835

(22) Filed: Feb. 5, 2020

(65) Prior Publication Data
US 2021/0243034 A1 Aug. 5, 2021

(51) Int. Cl.
*H04L 9/32* (2006.01)
*H04L 9/08* (2006.01)

(52) U.S. Cl.
CPC ............ *H04L 9/3242* (2013.01); *H04L 9/085* (2013.01); *H04L 9/0894* (2013.01)

(58) Field of Classification Search
CPC ..... H04L 9/3242; H04L 9/085; H04L 9/0894; H04L 63/20; H04L 49/351; H04L 41/082
See application file for complete search history.

(56) References Cited

U.S. PATENT DOCUMENTS

| | | | | |
|---|---|---|---|---|
| 7,664,110 B1* | 2/2010 | Lovett | ...................... | H04L 49/70 370/392 |
| 8,789,134 B2* | 7/2014 | Xiao | ........................ | G06F 21/57 726/1 |
| 9,203,826 B1* | 12/2015 | Margolis | .................. | H04L 63/08 |
| 2002/0191548 A1* | 12/2002 | Ylonen | ............... | H04L 63/0272 370/254 |
| 2010/0293372 A1* | 11/2010 | Fischer | ............... | H04L 65/1069 713/168 |
| 2011/0041003 A1* | 2/2011 | Pattar | .................... | H04W 12/10 714/4.3 |
| 2012/0072734 A1* | 3/2012 | Wishman | .............. | G06F 21/572 713/189 |

(Continued)

OTHER PUBLICATIONS

"Securing the future of Automotive", Marvell, 8 pgs., retrieved from the internet Jun. 7, 2021 at: https://www.itu.int/en/fnc/2018/Documents/2_Manfred_Kunz.pdf (Mar. 5, 2018).

(Continued)

*Primary Examiner* — J. Brant Murphy

(57) ABSTRACT

A communication system includes a network device including a plurality of communication ports and a plurality of communication nodes coupled with the network device through the plurality of communication ports. The communication system further includes a controller that is configured to generate a security key and to send a new configuration along with a message authentication code to the network device, wherein the controller is further configured to break the security key into parts and send the parts of the security key to at least some of the plurality of communication nodes such that each of the at least some of the plurality of communication node receiving one part of the parts of the security key. The network device is configured to retrieve the parts of the security key from the at least some of the plurality of communication nodes, to assemble the security key from the retrieved parts of the security key and using the assembled security key to authenticate the new configuration.

16 Claims, 2 Drawing Sheets

(56) References Cited

U.S. PATENT DOCUMENTS

2013/0242983 A1* 9/2013 Tripathi .................. H04L 47/10
                                                                370/355
2016/0182484 A1* 6/2016 Shih ........................ H04L 67/14
                                                                726/6
2019/0080091 A1* 3/2019 Kim ...................... H04L 9/0866
2019/0340363 A1* 11/2019 Walrant .............. H04L 63/0263

OTHER PUBLICATIONS

Asokan, N. et al. "ASSURED: Architecture for Secure Software Update of Realistic Embedded Devices", Cornell University Lib., 11 pgs., (Jul. 13, 2018).

Menezes, A. et al. "Chapter 12 Key Establishments Protocols", In: "Handbook of Applied Cryptography", pp. 489-541 (Jan. 1, 1997).

* cited by examiner

AUTHENTICATION WITHOUT PRE-KNOWN CREDENTIALS

BACKGROUND

In a communication network environment (e.g., Ethernet) some devices apply security measures to control and allow traffic according to certain rules. A firewall is an example of such kind of a device. It is common to apply the rules in hardware to support high data rate of the data plane. The hardware rules are configured by a control plane often implemented in some application software. Once the application software is compromised, it is likely that the applied rules are not authentic as defined and/or expected by the network owner (e.g., the manufacturer for vehicle network). The networking hardware should be able to authenticate the applied rules prior to allowing a deployment of the rules. The data authentication and integrity verification are traditionally implemented with the help of cryptography algorithms and associated security keys (e.g., secret or public keys). The use of cryptography comes with some constrains and system requirements which are possibly not acceptable for certain applications or devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a communication system is disclosed. The communication system includes a network device including a plurality of communication ports and a plurality of communication nodes coupled with the network device through the plurality of communication ports. The communication system further includes a controller that is configured to generate a security key and to send a new configuration along with a message authentication code to the network device, wherein the controller is further configured to break the security key into parts and send the parts of the security key to at least some of the plurality of communication nodes such that each of the at least some of the plurality of communication node receiving one part of the parts of the security key. The network device is configured to retrieve the parts of the security key from the at least some of the plurality of communication nodes, to assemble the security key from the retrieved parts of the security key and using the assembled security key to authenticate the new configuration.

In another embodiment, a method for authenticating a new configuration of a network device is disclosed. The method includes receiving the new configuration, a message authentication code that is generated using a data in the new configuration and a security key. The security key is not received with the new configuration. The parts of the security key are stored in a plurality of communication nodes coupled with the network device. The method further includes retrieving parts of the security key from the plurality communication nodes and assembling the parts of the security key. A new message authentication code is generated using the assembled security key and compared with the message authentication code. Upon a successful comparison the new configuration is deployed in the network device.

In yet another embodiment, a network device is disclosed. The network device includes a switch fabrics configured to receive a new configuration and a message authentication code for the network device from a controller. The message authentication code is generated using contents of the new configuration and a security key. The network device further includes a memory for at least temporarily storing the new configuration. A plurality of communication ports are coupled with the switch fabric. The communication ports are configured to be coupled with a plurality of communication nodes. The switch fabric is configured to retrieve parts of the security key from the plurality of communication ports and to reassemble the parts into an assembled security key. The switch fabric is configured to derive a new message authentication code using the assembled security key and the contents of the new configuration. The switch fabric further configured to compare the new message authentication code with the message authentication code and deploy the new configuration upon a successful comparison.

In some examples, the controller is further configured to send a version number of the new configuration to the at least some of the plurality of the communication nodes and to the network device. In some other examples, the controller is further configured to send a previous version number of a previously deployed configuration to the at least some of the plurality of the communication nodes and to the network device. The version numbers may be used to prevent a replay of a previous configuration deployment. The switch fabric is configured to authenticate the new configuration by comparing the message authentication code with the new message authentication code and to discard the new configuration if the comparing fails.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
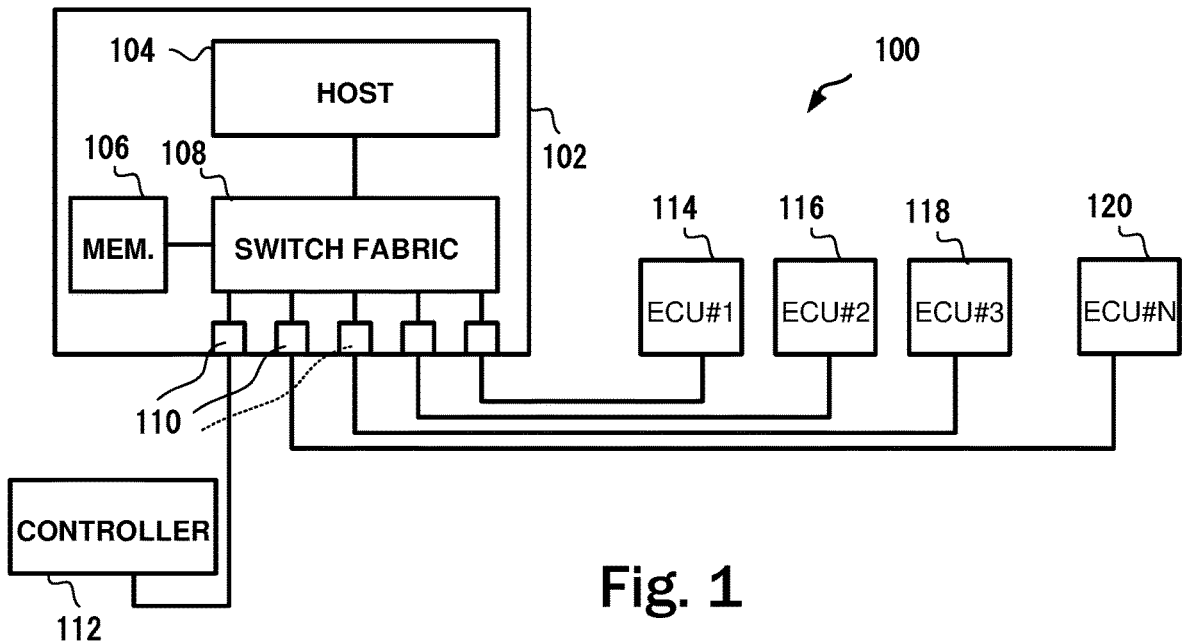
FIG. 1 depicts a communication network configured to authenticate a network configuration update without pre-known credentials in accordance with one or more embodiments of the present disclosure.

Note that figures are not drawn to scale. Not all components in the chip are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The configuration mechanism described herein operates in two steps in collaboration with a trusted partner. In the first step the new configuration for a device is acquired. The first step may also include acquiring an authentication code along with the new configuration. Even though a network device is used herein for the ease of describing the embodiments, the embodiments described herein may be applicable to devices other than the network device for the purpose of authenticating a configuration deployment. In the second step, the verification of the new configuration is performed based on credential information received from one or more trusted peers and, upon a successful verification, the new configuration is applied to the device. The device does not need to support secure storage to keep a copy of the security key that is used to authenticate and validate the new configuration. Using a peer based validation and authentication prevents a compromised control module of the device to provide a spurious configuration to the device.

FIG. 1 shows an schematic of a communication system 100. The communication system 100 includes a network switch 102 and a plurality of communication nodes (e.g., electronic control units or ECUs) 114, 116, 118, 120. The term ECU is typically used in the context of a vehicle network and being used in this description for example only. The embodiments described herein may be equally applicable to other types of communication networks having network switches and communication nodes.

The communication system 100 may include a controller 112 (e.g., a trusted partner). However, in some embodiments, the controller 112 may be a pluggable component that can be connected to the communication network 100 when a network configuration is needed to be applied or during an initial configuration of the communication system 100.

The network switch 102 includes a switch fabric 108 that is coupled to a plurality of network ports 110. The switch fabric 108 provides and implements a network topology of how a network is laid out and connected to switch traffic on a data or circuit-switched network. The network switch 102 may include a memory 106 to store topology or configuration data. A host 104 is included to provide a control logic to control the switch fabric 108. The configuration that controls the switch fabric 108 may include instructions to open or block certain ports in the plurality of network ports 110 and also what type of data can be transmitted among the communication nodes 114, 116, 118, 120 and the mechanism for the data transmission among the communication nodes 114, 116, 118, 120. Even though the embodiments described herein use the network switch 102 as a device whose configuration needs to be updated, in some examples, the embodiments described herein can be applicable to configuration updates of other types of network devices, such as a microcontroller.

The configuration update of the network switch 102 may require authentication of the new configuration data when it contains and relates to secure assets such as firewall rules. For security purposes, only authorized changes should be allowed and unauthorized modifications should be disallowed. In the context of an authenticated update to the configuration of the network switch 102, the embodiments describes herein overcome constraints related to the secure storage of a shared secret key (i.e., a security key) required to verify the updated configuration data.

The network switch 102 is configured to control the network traffic according to configured rules. The host 104 or the external host (microcontroller or MCU) 130 implements the control logic through a configuration that is applied to the switch fabric 108. Therefore, the MCU 130 or the host 104 are able to configure the switch fabric 108. However, the 104 or the MCU 130 are considered at risk of being compromised at runtime. A compromised host 108 or MCU 130 may pose security risk if they are allowed to update the configuration of the switch fabric 108.

Figure 2:
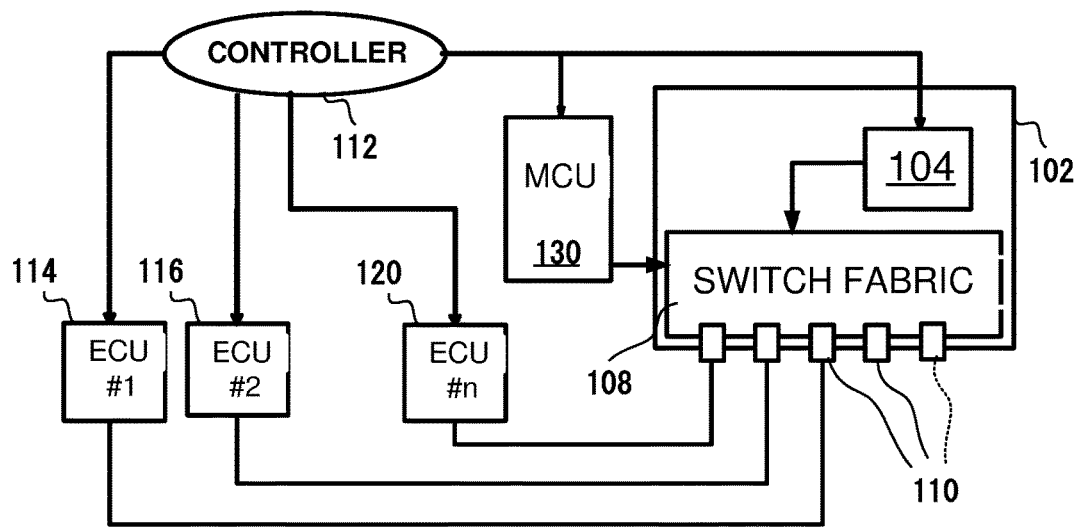
FIG. 2 shows a logical diagram of the communication network of FIG. 1.

FIG. 2 shows a logical diagram of the communication network 100. The controller 112 sets the initial configuration of the switch fabric 108 via either the MCU 130 or the host 104 during a secure execution phase. At the same time, the controller 112 may distribute a security key to some or all the ECUs 114, 116, 118, 120. However, the entire security key is not given to any of the ECUs 114, 116, 118, 120. The security key is broken up into parts and each of these parts are given to individual ECUs. The security key is not stored permanently in the network switch 102. The security key is used for the validation or authentication of the data that represents the switch fabric configuration. In some examples, the communication system 100 may include a plurality of network switches.

When the switch fabric 108 receives a new configuration either from the MCU 130 or the host 104, the new configuration is stored in the memory 106. However, the switch fabric 108 cannot assume that the new configuration is actually coming from the controller 112 because the MCU 130 and/or the host 104 may have been compromised. The network switch 102 does not store the security key that is needed to validate the new configuration. By not storing a complete security key in the network switch 102 or in other modules shown in FIG. 1 and FIG. 2, a compromised component cannot replace it with a key to provide a false validation of the new configuration. Instead, the network switch 102 or the switch fabric 108 requests parts of the security key from some or all the communication nodes 114, 116, 118, 120 and assembles the security key from the parts. The switch fabric 108 uses the assembled security key to validate the new configuration. If the new configuration actually came from the controller 112 that initially generated the security key, the configuration validation will pass and the new configuration will be deployed. However, if the new configuration was originating from a compromised component (e.g., the MCU 130 or the host 104), the validation with the assembled security key will fail and the new configuration will be discarded.

In some examples, if there is only one communication node (e.g., only ECU #1), the entire security key may be stored in ECU #1. In some examples, if there are a plurality of communication nodes, each storing a part of the security key, having one such communication node providing a wrong security key part would cause the assembled security key not being able to validate the new configuration. A deployment of a new configuration can be initiated by a trusted communication node at runtime. In other words, a pre-selected communication node (e.g., ECU #1) may act as the controller 112.

Figure 3:
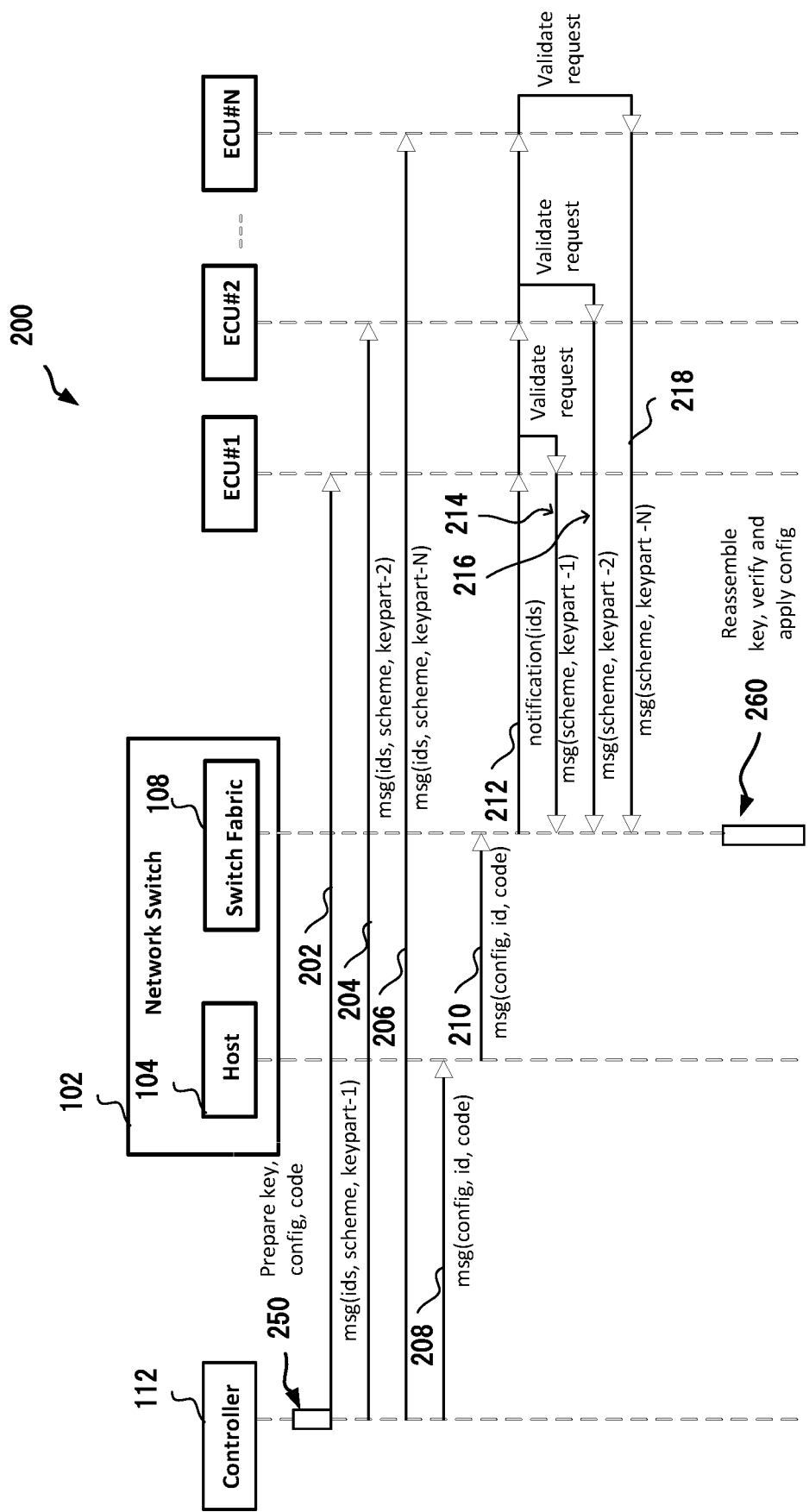
FIG. 3 displays a sequence diagram to illustrate authenticating a network configuration update without pre-known credentials in accordance with one or more embodiments of the present disclosure.

FIG. 3 displays a sequence diagram 200 to illustrate authenticating a network configuration update without pre-known credentials. At step 250, the controller 112 prepares a security key, the network configuration to be applied to the network switch 102 and a message authentication code (MAC). The MAC is a short piece of information used to authenticate a message to confirm that the message came from the stated sender and has not been changed. The MAC value protects both a message's data integrity as well as its authenticity, by allowing verifiers, who possess the security key, to detect any changes to the message content. The MAC may be generated using the message to be protected and a security key (the receiver of the message must have the same security key) using a MAC algorithm.

At steps 202, 204, 206, the controller 112 sends a message to the communication nodes ECU #1, ECU #2, ECU #N. The message includes a part of the security key generated at step 250. The message may also include the version number (id) of the new configuration an additional information about the new configuration (e.g., scheme or type). In some embodiments, the version number may be combined with the initial version number to form the parameter ids. The new configuration itself may not be sent to the communication nodes ECU #1, ECU #2, ECU #N. A receiver communication node stores the received part of the security key. At step 208, the controller 112 sends the new configuration, the version number and the MAC to the host 104 in the network switch 102 or to the MCU 130. At step 210, the host 104 transmits the message received at step 208 to the switch fabric 108. In some examples, at step 208 and 210, ids may be sent instead of only the version number (id) of the new configuration to be deployed.

At step 212, the switch fabric 108 sends a message, including id or ids, to the communication nodes ECU #1, ECU #2, ECU #N. At steps 214, 216, 218, the communication nodes ECU #1, ECU #2, ECU #N sends the parts of the security key back to the switch fabric 108. In some examples, the communication nodes ECU #1, ECU #2, ECU #N may first validate if the request for the security key parts has come from a valid source. The key parts are not made visible to the host 104 or the MCU 130.

At step 260, the switch fabric 108 reassembles the security key parts received from the communication nodes ECU #1, ECU #2, ECU #N and reassembles them to derive the security key. The switch fabric 108 then generates a MAC based on the received configuration and the reassembled security key and compares the generated MAC with the MAC received from the controller 112 via host 104 or MCU 130. If the comparison of the two MACs passes, the new configuration is deployed. Else, the new configuration is discarded.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A communication system, comprising:
a network device including a plurality of communication ports;
a plurality of communication nodes coupled with the network device through the plurality of communication ports; and
a controller, wherein the controller is configured to generate a security key and to send a new configuration along with a message authentication code to the network device, wherein the controller further configured to break the security key into parts and send the parts of the security key to at least some of the plurality of communication nodes such that each of the at least some of the plurality of communication nodes receiving one part of the parts of the security key; and
wherein the network device is configured to retrieve the parts of the security key from the at least some of the plurality of communication nodes, to assemble the security key from the retrieved parts of the security key and using the assembled security key to authenticate the new configuration.

2. The communication system of claim 1, wherein the controller is configured to generate the message authentication code using a data in the new configuration and the security key.

3. The communication system of claim 1, wherein the network device includes a switch fabric, wherein the switch fabric is configured to assemble the security key from the retrieved parts and to generate a new message authentication code using a data in the new configuration and the assembled security key.

4. The communication system of claim 1, wherein the controller is further configured to send a version number of the new configuration to the at least some of the plurality of the communication nodes and to the network device.

5. The communication system of claim 4, wherein the controller is further configured to send a previous version number of a previously deployed configuration to the at least some of the plurality of the communication nodes and to the network device.

6. The communication system of claim 3, wherein the switch fabric is configured to authenticate the new configuration by comparing the message authentication code with the new message authentication code.

7. The communication system of claim 6, wherein the switch fabric is configured to discard the new configuration if the comparing fails.

8. A method for authenticating a new configuration of a network device, the method comprising:
receiving the new configuration, a message authentication code that is generated using a data in the new configuration and a security key, wherein parts of the security key are stored in a plurality of communication nodes coupled with the network device;
retrieving parts of the security key from the plurality communication nodes;
assembling the parts of the security key; and
generating a new message authentication code using the assembled security key and comparing the message authentication code with the new message authentication code and upon a successful comparison, deploying the new configuration in the network device.

9. The method of claim 8, wherein the network device includes a switch fabric, wherein the switch fabric is configured to assemble the security key from the retrieved parts and to generate the new message authentication code using the data in the new configuration and the assembled security key.

10. The method of claim 8, wherein receiving the new configuration further includes receiving a version number of the new configuration.

11. The method of claim 10, wherein receiving the new configuration further includes receiving a previous version number of a previously deployed configuration.

12. The method of claim 9, wherein the switch fabric is configured to discard the new configuration if said comparing the message authentication code with the new message authentication fails.

13. A network device, comprising:
a switch fabric configured to receive a new configuration and a message authentication code for the network device from a controller, wherein the message authentication code is generated using contents of the new configuration and a security key;
a memory for at least temporarily storing the new configuration;
a plurality of communication ports coupled with the switch fabric, wherein the communication ports are configured to be coupled with a plurality of communication nodes; and
wherein the switch fabric is configured to retrieve parts of the security key from the plurality of communication ports and to reassemble the parts into an assembled security key, wherein the switch fabric is configured to derive a new message authentication code using the assembled security key and the contents of the new configuration,
wherein the switch fabric is further configured to compare the new message authentication code with the message authentication code and deploy the new configuration upon a successful comparison.

14. The network device of claim 13, wherein the switch fabric is further configured to receive a version number of the new configuration.

15. The network device of claim 14, wherein the switch fabric is configured to receive a previous version number of a previously deployed configuration.

16. The network device of claim 13, wherein the switch fabric is further configured to discard the new configuration if the comparison fails.

* * * * *